United States Patent [19]
Stiller

[11] 3,881,130
[45] Apr. 29, 1975

[54] SWITCHING ARRANGEMENT FOR IGNITING SUPPLEMENTARY FLASH LIGHT UNITS

[75] Inventor: Armin Stiller, Braunschweig, Germany

[73] Assignee: Roller-Werke Franke & Heidecke, Braunschweig, Germany

[22] Filed: Nov. 26, 1973

[21] Appl. No.: 418,843

[30] Foreign Application Priority Data
Dec. 1, 1972 Germany............................ 2258834

[52] U.S. Cl. ................ 315/230; 315/232; 315/238; 315/241 P
[51] Int. Cl. .......................................... H05b 37/00
[58] Field of Search ........... 315/228, 230, 232, 238, 315/241 R, 241 P, 241 S

[56] References Cited
UNITED STATES PATENTS
| | | | |
|---|---|---|---|
| 3,593,061 | 7/1971 | Takahata et al................. | 315/241 P |
| 3,636,406 | 1/1972 | Ackermann..................... | 315/241 R |

FOREIGN PATENTS OR APPLICATIONS
| | | | |
|---|---|---|---|
| 1,111,290 | 7/1961 | Germany......................... | 315/241 P |
| 1,051,404 | 2/1959 | Germany......................... | 315/241 P |

*Primary Examiner*—James B. Mullins
*Attorney, Agent, or Firm*—Stonebraker, Shepard & Stephens

[57] ABSTRACT

A switching arrangement for firing one or more supplementary or auxiliary electronic flash units, attached to a main flash unit merely by a two-conductor cable, so arranged that all of the supplementary units will fire or ignite simultaneously with the main flash unit, rather than firing successively. The supplementary unit (or each of them, if more than one is used) has its own storage capacitor and flash tube, arranged in parallel with each other and with the storage capacitor and flash tube of the main unit. Each supplementary unit also has its own separate firing circuit, including a firing capacitor and a thyristor so arranged that a drop in potential, caused by the firing of the flash tube of the main unit, will render the thyristor of each supplementary unit conductive, thereby activating the firing circuit of each supplementary unit, to cause simultaneous firing of all of the flash tubes of all of the supplementary units connected to the main flash unit.

2 Claims, 1 Drawing Figure

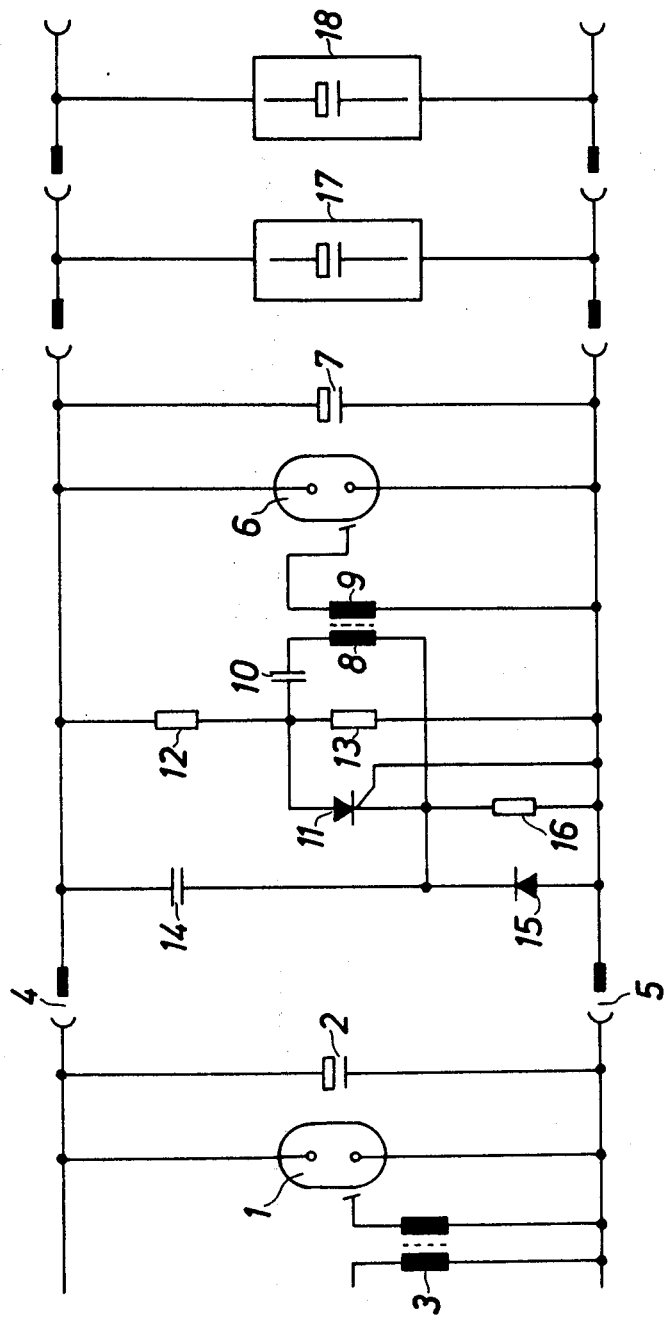

2

SWITCHING ARRANGEMENT FOR IGNITING SUPPLEMENTARY FLASH LIGHT UNITS

BACKGROUND OF THE INVENTION

In taking flash photographs, it is frequently desired to have more than one flash unit, to provide greater illumination for the subject or object being photographed. One unit of the flash apparatus is regarded as the main unit, suitably connected in the conventional way with the shutter of a camera, so as to be ignited or fired in synchronism with the operation of the camera shutter. This is well understood in the art.

If one or more additional or supplementary flash light units are employed, it is usually not convenient to connect each one separately to the camera, for firing in synchronism with operation of the camera shutter. It is preferred, instead, to connect the supplementary flash units to the main or basic flash unit. The present invention deals with such a situation, where one or any desired number of supplementary flash units may be connected to the main or basic flash unit, the circuit arrangement being such that all of the flash units will fire or ignite simultaneously, rather than in a serial or successive manner.

The object of the invention is to provide a simple, inexpensive, and sturdy arrangement for accomplishing this.

Another object of the invention is the provision of a circuit arrangement so designed that each supplementary flash unit is operatively connected to the main flash unit by merely a two-wire or two-conductor cable, without requiring three or more connecting conductors, and yet with only this two-wire connection, each connected flash unit will fire simultaneously with all of the other connected flash units, and each can be effectively and quickly recharged after one flash, ready for another flash.

BRIEF DESCRIPTION OF THE DRAWING

The single FIGURE is a schematic wiring diagram illustrating the circuitry of a supplementary flash light unit according to a preferred embodiment of the present invention, and the connections thereof to the main flash unit and to other supplementary flash units.

DESCRIPTION OF THE PREFERRED EMBODIMENT

A fragment of the main or basic electronic flash unit is shown at the left hand end of the wiring diagram. It includes the main flash tube 1, the storage capacitor 2 for powering the flash tube, and the ignition transformer 3. These parts, as well as other parts not illustrated, are conventional and well known in the art. When the shutter of the associated camera is operated to make an exposure, the closing of the synchronizer switch on the camera causes a momentary current to flow through the primary winding of the transformer 3, which induces a high tension pulse in the secondary winding of the transformer, connected to the firing electrode of the flash tube 1, thereby igniting the flash tube so that the charge stored on the storage capacitor 2 discharges through the tube 1 and creates the desired flash to illuminate the object or subject being photographed.

The additional or supplementary flash light unit is connected to the main unit by only a two wire cable, plug-in connections being indicated schematically at 4 and 5. The supplementary unit has a flash lamp 6, and its storage capacitor 7 in parallel with each other, connected across the two leads or main conductors of the unit, running horizontally at top and bottom of the wiring diagram. It also has an ignition transformer with a primary winding 8 and a secondary winding 9 connected as shown. The primary winding 8 is connected in series with the ignition capacitor 10 and the thyristor 11.

The circuit conductor 51 at the bottom of the wiring diagram (leading from the plug connection 5) is negative or minus with respect to the circuit conductor 41 (leading from the plug 4) at the top of the wiring diagram. The conductor 51 is preferably at ground potential, while the conductor 41 is at a high positive potential. The ignition voltage for the ignition capacitor 10 is supplied by the voltage divider formed by resistors 12 and 13 connected in series with each other, between the two conductors 41 and 51, as shown. The capacitor 14 and a diode 15 are also in series with each other, between the conductors 41 and 51, and thus in parallel with the flash tube 6 and storage capacitor 7.

The cathode of the thyristor 11 is connected to the minus or negative line 51 through the resistor 16, and connected with the high tension positive conductor 41 through the capacitor 14. The gate of the thyristor 11 is connected directly to the minus or negative line 51.

When the main flash tube 1 of the main flash unit is ignited or flashed in the usual manner, a drop takes place in the volage in the storage capacitors 2 and 7, and thus also in the capacitor 14 and resistor 16, which are in series with each other. The result is that the charged capacitor 14 is discharged through the resistor 16. The potential at the cathode of the thyristor 11 thus becomes negative in respect of circuit conductors 5, so that the thyristor cuts through or becomes conductive, and ignites the flash tube 6 by reason of the discharge of capacitor 100 through the thyristor 11 and through the primary winding 8 of the ignition transformer, which causes a surge or pulse in the secondary winding 9 of the transformer, connected to the ignition electrode of the flash tube 6, thus causing the flash tube 6 to fire. This occurs before the re-charging of the capacitor 7 to the capacitor 2 can be initiated.

Further subsidiary or supplementary flash units are indicated schematically at 17 and 18, each of these being of the same construction above described. As many such flash units as desired may be plugged together, simply by the two-wire circuit cable, and all of the flash units will fire simultaneously with each other and with the firing of the main flash tube 1, since all ignitions are initiated by the reduction taking place in the voltage in the capacitors 2, 7, and the storage capacitors in any desired additional units such as 17 and 18, all of such capacitors being connected in parallel with each other.

What is claimed is:

1. A supplementary flash light unit for connection by a two-conductor cable to a main flash unit for firing the supplementary unit simultaneously with and as a result of the firing of said main unit, said supplementary unit comprising a first positive high tension conductor for connection to a positive high tension conductor of the main unit, a second conductor negative with respect to said first conductor for connection to a different conductor of the main unit, a flash tube connected between said first and second conductors of the supplementary unit, a storage capacitor connected in parallel with said flash tube, and a firing circuit for said flash tube, said firing circuit including a firing capacitor, a firing transformer, and a thyristor having an anode-cathode path in series with said firing capacitor and firing transformer in a loop circuit, said thyristor having a cathode connected to said first conductor through a capacitor and also connected to said second conductor through a diode and through a resistor in parallel with said diode, said thyristor also having a gate connected directly to said second conductor, said elements being so dimensioned that upon firing a flash tube in a main flash unit to which said supplementary unit is operatively connected, said last mentioned capacitor discharges through said resistor and said diode, thereby causing a change in voltage applied to said thyristor to cause the anode-cathode path of said thyristor to become conductive so that said firing capacitor discharges through the anode-cathode path of said thyristor and through said firing transformer, to cause said firing transformer to provide a pulse to fire said flash tube of said supplementary unit.

2. A unit as defined in claim 1, wherein said flash tube has both poles connected directly to respective poles of said main flash unit through said first conductor and second conductor of said supplementary unit without interposition of any resistor between either pole of said flash tube of the supplementary unit and the corresponding respective pole of the main flash unit.

* * * * *

UNITED STATES PATENT OFFICE
CERTIFICATE OF CORRECTION

Patent No. 3,881,130     Dated April 29, 1975

Inventor(s) Armin Stiller

It is certified that error appears in the above-identified patent and that said Letters Patent are hereby corrected as shown below:

On the Cover Sheet, in item [73] "Roller" should read -- Rollei --.

Signed and sealed this 15th day of July 1975.

(SEAL)
Attest:

RUTH C. MASON
 Attesting Officer

C. MARSHALL DANN
Commissioner of Patents
 and Trademarks